United States Patent
Wang

(10) Patent No.: US 10,587,904 B2
(45) Date of Patent: Mar. 10, 2020

(54) PROCESSING MEDIA DATA USING AN OMNIDIRECTIONAL MEDIA FORMAT

(71) Applicant: QUALCOMM Incorporated, San Diego, CA (US)

(72) Inventor: Yekui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/028,248

(22) Filed: Jul. 5, 2018

(65) Prior Publication Data

US 2019/0014361 A1 Jan. 10, 2019

Related U.S. Application Data

(60) Provisional application No. 62/530,746, filed on Jul. 10, 2017.

(51) Int. Cl.
*H04N 21/236* (2011.01)
*H04N 21/845* (2011.01)
*H04N 21/81* (2011.01)
*H04N 21/85* (2011.01)
*H04N 21/2387* (2011.01)
(Continued)

(52) U.S. Cl.
CPC ... *H04N 21/23605* (2013.01); *H04N 21/2387* (2013.01); *H04N 21/234327* (2013.01); *H04N 21/4307* (2013.01); *H04N 21/6336* (2013.01); *H04N 21/816* (2013.01); *H04N 21/84* (2013.01); *H04N 21/8456* (2013.01);
(Continued)

(58) Field of Classification Search
CPC ....... H04N 21/23605; H04N 21/23427; H04N 21/2387; H04N 21/4307
See application file for complete search history.

(56) References Cited

U.S. PATENT DOCUMENTS

| 6,539,054 B1 * | 3/2003 | Matsui ............. H04N 21/23412 348/575 |
| 2015/0063774 A1 * | 3/2015 | Brown, Jr. ............. G11B 27/19 386/203 |

(Continued)

OTHER PUBLICATIONS

Byeongdoo Choi et al: "OMAF DIS text with updates based on Berlin OMAF AHG meeting agreements", Jul. 2017, ISO/IEC JTC1/SC29/WG11 M40849.*

(Continued)

*Primary Examiner* — Sumaiya A Chowdhury
(74) *Attorney, Agent, or Firm* — Shumaker & Sieffert, P.A.

(57) ABSTRACT

A device includes a processor configured to process a first sample of a first track having a first composition time, determine whether a second track that is associated with the first track has an available sample at the first composition time, when the second track has the available sample at the first composition time, select the available sample of the second track as a second sample having a common composition time with the first composition time of the first sample, when the second track does not have the available sample at the first composition time, select a sample of the second track having a composition time that is a closest available preceding composition time as the second sample having the common composition time with the first composition time of the first sample, and in response to selecting the second sample, process the second sample.

38 Claims, 5 Drawing Sheets

(51) Int. Cl.
*H04N 21/84* (2011.01)
*H04N 21/6336* (2011.01)
*H04N 21/8547* (2011.01)
*H04N 21/43* (2011.01)
*H04N 21/2343* (2011.01)
*H04N 21/854* (2011.01)

(52) U.S. Cl.
CPC ......... *H04N 21/85* (2013.01); *H04N 21/8547* (2013.01); *H04N 21/85406* (2013.01)

(56) References Cited

U.S. PATENT DOCUMENTS

| | | | |
|---|---|---|---|
| 2016/0342596 A1* | 11/2016 | Aksu | G01C 21/165 |
| 2017/0171610 A1 | 6/2017 | Nair et al. | |
| 2018/0077210 A1* | 3/2018 | Hannuksela | H04L 65/4076 |

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
International Standard ISO/IEC 14496-12, Information Technology—Coding of audio-visual objects—Part 12: ISO base media tile format, Third Edition, Oct. 15, 2008, 120 pp.
International Standard ISO/IEC 14496-15, Information Technology—Coding of audio-visual objects—Part 15: ISO base media tile format, Jan. 13, 2014, 179 pp.
Fielding et al., "Hypertext Transfer Protocol—HTTP/1.1," Network Working Group, Standards Track, RFC 2616, Jun. 1999, Retrieved from https://tools.ietf.org/html/rfc2616 on Feb. 23, 2017, 177 pp.
Paila et al., "FLUTE—File Delivery over Unidirectional Transport," Internet Engineering Task Force (IETF), Standards Track, RFC 6726, Nov. 2012, Retrieved from https://tools.ietf.org/html/rfc6726 on Feb. 23, 2017, 47 pp.
ISO/IEC 23009-1: "Information technology—Dynamic adaptive streaming over HTTP (DASH)—Part 1: Media presentation description and segment formats," Technologies de l'information—Diffusion en flux adaptatif dynamique sur HTTP (DASH)—Part 1: Description of the presentation and delivery of media formats, ISO/IEC 23009-1 International Standard, First Edition, Apr. 2012, XP002712145, 132 pp.
International Standard, Information technology—high efficiency coding and media delivery in heterogeneous environments—Part 2: High efficiency video coding ISO/IEC 23008-2, First edition, Dec. 1, 2013, 312 pp.
International Standard, Information Technology—Coded Representation of immersive media (MPEG-I)—Part 2: Omnidirectional media format, ISO/IEC FDIS 23090-2:201x (E), Apr. 26, 2018, 182 pp.
"Technical Specification Group Services and System Aspects; Transparent end-to-end packet switched streaming service (PSS); 3GPP file format (3GP)," 3rd Generation Partnership Project, Release 12, 3GPP TS 26.244 V9.1.0, Dec. 2013, 61 pp.
Denoual F., et al., "Editorial Comments on OMAF DIS", 119th MPEG Meeting; Jul. 17, 2017-Jul. 21, 2017; Torino; (Motion Picture Expert Group or ISO/IEC JTC1/SC29/WG11),,No. m40791, May 26, 2017, XP030069135, 3 pages.
Hannuksela M.M., (Nokia): "OMAF: Generic or Profile-Specific Constraints on DASH Descriptors", 119th MPEG Meeting; Jul. 17, 2017-Jul. 21, 2017; Torino; (Motion Picture Expert Group or ISO/IEC JTC1/SC29/WG11),, No. m40801, May 26, 2017, XP030069145, 3 pages.
International Search Report and Written Opinion—PCT/US2018/041106—ISO/EPO—dated Oct. 1, 2018.

* cited by examiner

PROCESSING MEDIA DATA USING AN OMNIDIRECTIONAL MEDIA FORMAT

This application claims the benefit of U.S. Provisional Application No. 62/530,746, filed Jul. 10, 2017, the entire contents of which are hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to High Efficiency Video Coding (HEVC)), and extensions of such standards, such as scalable and multiview extensions, to transmit and receive digital video information more efficiently.

After media data has been encoded, the media data may be packetized for transmission or storage. The media data may be assembled into a media file conforming to any of a variety of standards, such as the International Organization for Standardization (ISO) base media file format (BMFF) and extensions thereof, such as AVC.

SUMMARY

In general, this disclosure describes techniques related to processing and transmission (e.g., sending and/or receiving or retrieving) media data for virtual reality (VR), augmented reality, and/or 360-degree video applications. In particular, this disclosure describes techniques for processing media data conforming to an omnidirectional media format.

In one example, a method of processing media data includes processing a first sample of a first track of a media file, the first track having a first composition time, determining whether a second track of the media file, the second track being associated with the first track, has an available sample at the first composition time, when the second track has the available sample at the first composition time, selecting the available sample of the second track as a second sample having a common composition time with the first composition time of the first sample, when the second track does not have the available sample at the first composition time, selecting a sample of the second track having a composition time that is a closest available preceding composition time as the second sample having the common composition time with the first composition time of the first sample; and in response to selecting the second sample, processing the second sample.

In another example, a device for processing media data includes a memory configured to store video data, and a processor comprising circuitry configured to process a first sample of a first track having a first composition time, determine whether a second track that is associated with the first track has an available sample at the first composition time, when the second track has the available sample at the first composition time, select the available sample of the second track as a second sample having a common composition time with the first composition time of the first sample, when the second track does not have the available sample at the first composition time, select a sample of the second track having a composition time that is a closest available preceding composition time as the second sample having the common composition time with the first composition time of the first sample, and in response to selecting the second sample, process the second sample.

In another example, a device for processing media data includes means for processing a first sample of a first track of a media file, the first track having a first composition time, means for determining whether a second track of the media file, the second track being associated with the first track, has an available sample at the first composition time, means for selecting, when the second track has the available sample at the first composition time, the available sample of the second track as a second sample having a common composition time with the first composition time of the first sample, means for selecting, when the second track does not have the available sample at the first composition time, a sample of the second track having a composition time that is a closest available preceding composition time as the second sample having the common composition time with the first composition time of the first sample, and means for processing, in response to selecting the second sample, the second sample.

In another example, a computer-readable storage medium having stored thereon instructions that, when executed, cause a processor to process a first sample of a first track of a media file, the first track having a first composition time, determine whether a second track of the media file, the second track being associated with the first track, has an available sample at the first composition time, when the second track has the available sample at the first composition time, select the available sample of the second track as a second sample having a common composition time with the first composition time of the first sample, when the second track does not have the available sample at the first composition time, select a sample of the second track having a composition time that is a closest available preceding composition time as the second sample having the common composition time with the first composition time of the first sample, and in response to selecting the second sample, process the second sample.

The details of one or more examples are set forth in the accompanying drawings and the description below. Other features, objects, and advantages will be apparent from the description and drawings, and from the claims.

DETAILED DESCRIPTION

Figure 1:
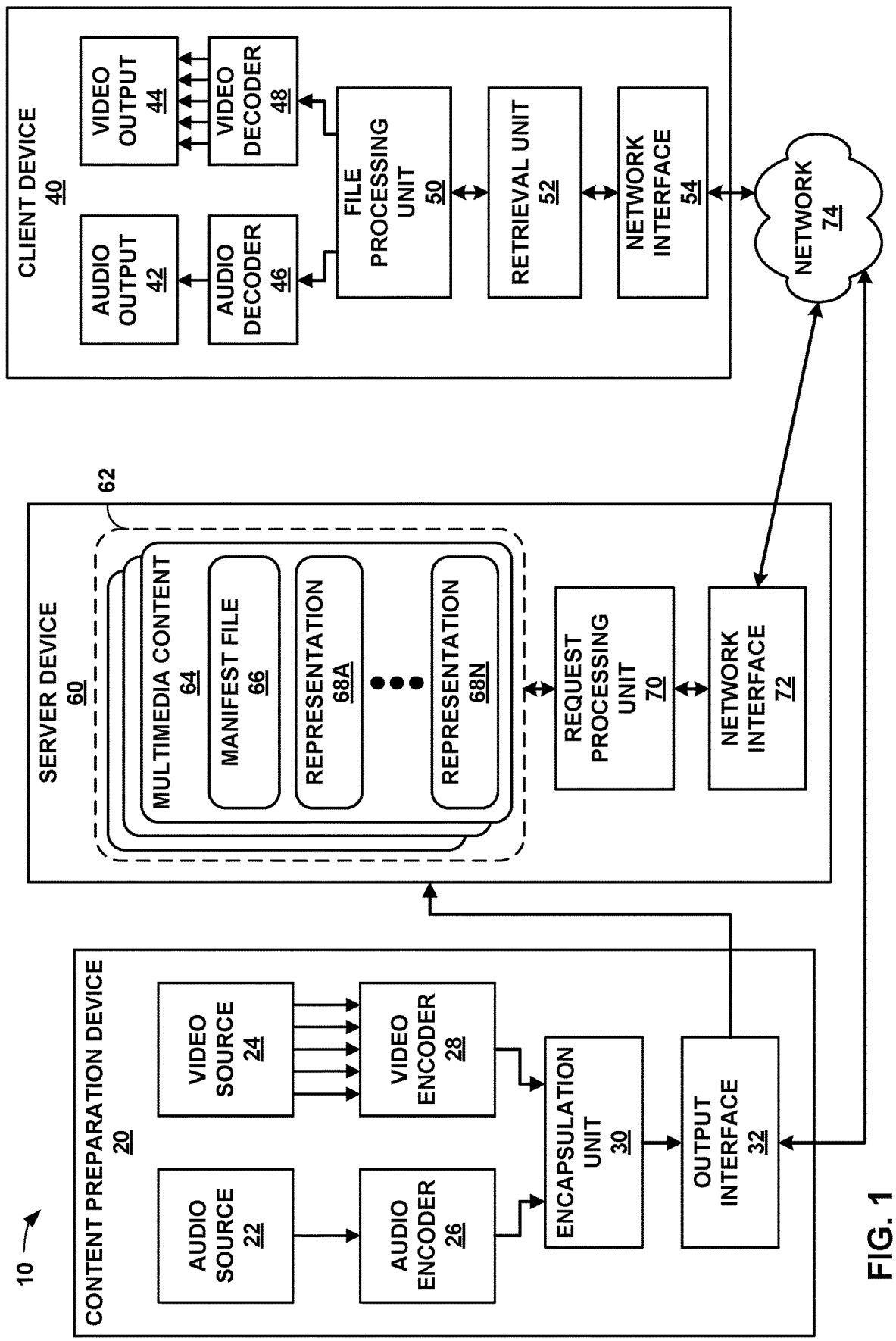
FIG. 1 is a block diagram illustrating an example system that implements techniques for streaming media data over a network.

The techniques of this disclosure may be applied to video files conforming to video data encapsulated according to any of ISO base media file format (ISOBMFF), extensions to ISOBMFF, Scalable Video Coding (SVC) file format, Advanced Video Coding (AVC) file format, High Efficiency Video Coding (HEVC) file format, Third Generation Partnership Project (3GPP) file format, and/or Multiview Video Coding (MVC) file format, or other video file formats. A draft of ISO BMFF is specified in ISO/IEC 14496-12, available from phenix.int-evry.fr/mpeg/doc_end_user/documents/111_Geneva/wg11/w15177-v6-w15177.zip. A draft of another example file format, MPEG-4 file format, is specified in ISO/IEC 14496-15, available from wg11.sc29.org/doc_end_user/documents/115_Geneva/wg11/w16169-v2-w16169.zip.

ISOBMFF is used as the basis for many codec encapsulation formats, such as the AVC file format, as well as for many multimedia container formats, such as the MPEG-4 file format, the 3GPP file format (3GP), and the digital video broadcasting (DVB) file format.

In addition to continuous media, such as audio and video, static media, such as images, as well as metadata can be stored in a file conforming to ISOBMFF. Files structured according to the ISOBMFF may be used for many purposes, including local media file playback, progressive downloading of a remote file, segments for Dynamic Adaptive Streaming over HTTP (DASH), containers for content to be streamed and its packetization instructions, and recording of received real-time media streams.

A box is an elementary syntax structure in ISOBMFF, including a four-character coded box type, the byte count of the box, and the payload. An ISOBMFF file includes a sequence of boxes, and boxes may contain other boxes. According to ISOBMFF, a Movie box ("moov") contains the metadata for the continuous media streams present in the file, each one represented in the file as a track. Per ISOBMFF, metadata for a track is enclosed in a Track box ("trak"), while the media content of a track is either enclosed in a Media Data box ("mdat") or provided directly in a separate file. The media content for tracks includes a sequence of samples, such as audio or video access units.

ISOBMFF specifies the following types of tracks: a media track, which contains an elementary media stream, a hint track, which either includes media transmission instructions or represents a received packet stream, and a timed metadata track, which comprises time-synchronized metadata.

Although originally designed for storage, the ISOBMFF has proven to be very valuable for streaming, e.g., for progressive download or DASH. For streaming purposes, movie fragments defined in ISOBMFF can be used.

The metadata for each track includes a list of sample description entries, each providing the coding or encapsulation format used in the track and the initialization data needed for processing that format. Each sample is associated with one of the sample description entries of the track.

The ISOBMFF enables specifying sample-specific metadata with various mechanisms. Specific boxes within the Sample Table box ("stbl") have been standardized to respond to common needs. For example, a Sync Sample box ("stss") is used to list the random access samples of the track. The sample grouping mechanism enables mapping of samples according to a four-character grouping type into groups of samples sharing the same property specified as a sample group description entry in the file. Several grouping types have been specified in the ISOBMFF.

Virtual reality (VR) is the ability to be virtually present in a virtual, non-physical world created by the rendering of natural and/or synthetic images and sounds correlated by movements of an immersed user, allowing interaction with that virtual world. With recent progress made in rendering devices, such as head mounted displays (HMD) and VR video (often also referred to as 360-degree video) creation, a significant quality of experience can be offered. VR applications include gaming, training, education, sports video, online shopping, entrainment, and so on.

A typical VR system includes the following components and steps:
1) A camera set, which typically includes multiple individual cameras pointing in different directions, ideally collectively covering all viewpoints around the camera set.
2) Image stitching, where video pictures taken by the multiple individual cameras are synchronized in the time domain and stitched in the space domain, to be a spherical video, but mapped to a rectangular format, such as equi-rectangular (like a world map) or cube map.
3) The video in the mapped rectangular format is encoded/compressed using a video codec, e.g., H.265/HEVC or H.264/AVC.
4) The compressed video bitstream(s) may be stored and/or encapsulated in a media format and transmitted (possibly only the subset covering the area being seen by a user, sometimes referred to as the viewport) through a network to a receiving device (e.g., a client device).
5) The receiving device receives the video bitstream(s) or part thereof, possibly encapsulated in a file format, and sends the decoded video signal or part thereof to a rendering device (which may be included in the same client device as the receiving device).
6) The rendering device can be, e.g., an HMD, which can track head movement and even eye move moment, and may render the corresponding part of the video such that an immersive experience is delivered to the user.

Omnidirectional MediA Format (OMAF) is being developed by the Moving Pictures Experts Group (MPEG) to define a media format that enables omnidirectional media applications, focusing on VR applications with 360-degree video and associated audio. OMAF specifies a list of projection methods that can be used for conversion of a spherical or 360-degree video into a two-dimensional rectangular video, followed by how to store omnidirectional media and the associated metadata using the ISO base media file format (ISOBMFF) and how to encapsulate, signal, and stream omnidirectional media using dynamic adaptive streaming over HTTP (DASH), and finally, which video and audio codecs, as well as media coding configurations, can be used for compression and playback of the omnidirectional media signal. OMAF is to become ISO/IEC 23090-2, and a draft specification is available from wg11.sc29.org/doc_en-d_user/documents/119_Torino/wg11/m40849-v1-m40849_OMAF_text_Berlin_output.zip.

In HTTP streaming protocols, such as DASH, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

DASH is specified in ISO/IEC 23009-1, and is a standard for HTTP (adaptive) streaming applications. ISO/IEC 23009-1 mainly specifies the format of the media presentation description (MPD), also known as a manifest or manifest file, and media segment formats. The MPD describes the media available on a server and allows a DASH client to autonomously download an appropriate media version at an appropriate media time.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

A typical procedure for DASH based HTTP streaming includes the following steps:

1) A DASH client obtains the MPD of a streaming content, e.g., a movie. The MPD includes information on different alternative representations, e.g., bit rate, video resolution, frame rate, audio language, of the streaming content, as well as URLs of the HTTP resources (the initialization segment and the media segments).

2) Based on information in the MPD and local information available to the DASH client, e.g., network bandwidth, decoding/display capabilities, and user preferences, the DASH client requests the desired representation(s), one segment (or a part thereof) at a time.

3) When the DASH client detects a network bandwidth change, it requests segments of a different representation with a better-matching bitrate, ideally starting from a segment that starts with a random access point.

During an HTTP streaming "session," to respond to a user request to seek backward to a past position or forward to a future position, the DASH client requests past or future segments starting from a segment that is close to the desired position and that ideally starts with a random access point. The user may also request to fast-forward the content, which may be realized by requesting data sufficient for decoding only intra-coded video pictures or only a temporal subset of the video stream.

Video data may be encoded according to a variety of video coding standards. Such video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC) and multiview extension (i.e., multiview high efficiency video coding, MV-HEVC).

This disclosure describes various constraints that may be added to the OMAF draft specification to improve processing of media data (such as encapsulation, decapsulation, encoding, and/or decoding). In general, such constraints allow devices to infer characteristics of a media bitstream, such that events that cannot happen according to the constraint need not be accounted for, e.g., by a data assembler/constructor (such as a content preparation device or server device) or by a data parser (such as a client device, e.g., a file processing unit or decapsulation unit). For example, if a constraint specifies that certain data may only be present when a condition is true, if the condition is false, the constrained data need not be processed. Additionally or alternatively, if the data is present, then the stated condition can be inferred to be true. More particularly, a context-free grammar corresponding to a bitstream may be formed that accounts for the various conditions to specify whether subsequent data corresponds to the constrained data or not. Likewise, a data generation unit and a data parsing unit may be implemented and configured according to the context-free grammar.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/Advanced Video Coding (AVC) and ITU-T H.265/High Efficiency Video Coding (HEVC), define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a conforming decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to file processing unit 50. File processing unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and file processing unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or file processing unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to file processing unit 50, via retrieval unit 52. File processing unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Clause 3.1 of the OMAF draft specification, the definition of "time-parallel sample" is as follows:

Time-parallel sample: sample in an associated track that has the same or, when a sample with the same decoding time is not available, the closest preceding decoding time relative to that of a particular sample in a track.

The term is used for sub-picture composition tracks specified in clause 7.1.1 of the OMAF draft specification. However, using this definition for sub-picture composition tracks would require file composers (such as encapsulation unit 30), or even video encoders (such as video encoder 28), to generate the same decoding time for all sub-pictures belonging to the same composition picture. This may not be desirable, as the sub-picture bitstreams are typically independent from each other, from the video coding point of view.

Thus, content preparation device 20, server device 60, and/or client device 40 may be configured according to a definition of "time-parallel sample" as follows:

Time-parallel sample: sample in an associated track that has the same or, when a sample with the same composition time is not available, the closest preceding composition time relative to that of a particular sample in a track.

The changed term (or a different term with the same or similar definition based on composition time, which is also referred to as presentation time) is used in the sub-picture composition tracks. This way, encapsulation unit 30 and video encoder 28 would not need to generate the same decoding time for all sub-pictures belonging to the same composition picture, fully allowing the sub-picture bitstreams to be completely independent from each other from video coding point of view. In this manner, encapsulation unit 30, video encoder 28, retrieval unit 52, file processing unit 50, and/or video decoder 48 may process a first sample and a time-parallel sample to the first sample that have the same or similar composition times, but not necessarily the same decoding time.

In particular, encapsulation unit 30 and/or file processing unit 50 may process a first sample of a first track of a media file. The first sample has a first composition (that is, presentation) time. Encapsulation unit 30 and/or file processing unit 50 may then determine whether a second track of the media file that is associated with the first track has a sample available at the first composition time. When the second track has the available sample at the first composition time, encapsulation unit 30 and/or file processing unit 50 may select the available sample of the second track as a second sample having a common composition time with the first composition time of the first sample. However, when the second track does not have the sample available at the first composition time, encapsulation unit 30 and/or file processing unit 50 may select a sample of the second track having a composition time that is a closest available preceding composition time as the second sample having the common composition time with the first composition time of the first sample. In either case, in response to selecting the second sample, encapsulation unit 30 and/or file processing unit 50 may process the second sample.

Clause 7.1.2 of the OMAF draft specification specifies the composition restriction box. The presence of this box indicates that a track is not intended to be presented alone without other visual tracks. When this box is not present, the track may or may not be intended to be presented alone without other visual tracks. This disclosure recognizes that it is unnecessary to include the composition restriction box in a sample entry of a track that does not belong to a sub-picture composition track group or that is not a tile track. This is because only the video stream carried by a track that belongs to a sub-picture composition track group or a tile track may contain insufficient video material to be meaningfully presented alone. However, conventionally, the composition restriction box may be included in the sample entry of any visual track.

Thus, in addition or in the alternative to the techniques discussed above, content preparation device 20, server device 60, and/or client device 40 may be configured according to a constraint specifying that a track for which a sample entry contains a composition restriction box shall belong to a sub-picture composition track group or shall be a tile track. The constraint may further specify that, in the latter case (that a track including the composition restriction box is a tile track), the presence of the composition restriction box indicates that the tile track, together with the associated tile base track, is not suitable for presentation, even when data of the track is decodable.

Accordingly, any or all of content preparation device 20, server device 60, and/or client device 40 may be configured to infer characteristics about a track when the track includes the composition restriction box, such as determining that the track either belongs to a sub-picture composition track group or that the track is a tile track. Additionally or alternatively, content preparation device 20, server device 60, and/or client device 40 may be configured to avoid processing data corresponding to the composition restriction box when a corresponding track does not belong to a sub-picture composition track group and is not a tile track (e.g., may infer that the composition restriction box is not present).

Clause 7.2.3 of the OMAF draft specification specifies the projected omnidirectional video box. This box provides information on the projection type and other such data. The OMAF draft specification defines this box as an extension of the Box( ) structure, as follows:

```
aligned(8) class ProjectedOmniVideoBox extends Box('povd') {
    ProjectionFormatBox( ); // mandatory
    // optional boxes
}
```

However, this disclosure recognizes that this definition does not allow different versions of a projected omnidirectional video box, among other shortcomings. Thus, in addition or in the alternative to the techniques discussed above, content preparation device 20, server device 60, and/or client device 40 may be configured according to a definition of the projected omnidirectional video box as an extension of the FullBox( ) structure, as follows:

```
aligned(8) class ProjectedOmniVideoBox extends FullBox('povd', 0, 0) {
    ProjectionFormatBox( ); // mandatory
    // optional boxes
}
```

Clause 7.2.5 of the OMAF draft specification specifies a region-wise packing (RWP) box. RWP enables manipulations (resize, reposition, rotation, and mirroring) of any rectangular region of the projected picture. Currently, the regions of the projected picture can overlap. However, this disclosure recognizes that there is no technical benefit of allowing that. Thus, allowing such overlap would make the design more complicated, which increases implementation costs as well as costs for testing an implementation.

Accordingly, in addition or in the alternative to the techniques discussed above, content preparation device 20, server device 60, and/or client device 40 may be configured according to a restriction preventing overlapping projected regions, e.g., according to the following constraint:

The rectangle specified by proj_reg_width[i], proj_reg_height[i], proj_reg_top[i], and proj_reg_left[i] shall be non-overlapping with the rectangle specified by proj_reg_width[j], proj_reg_height[j], proj_reg_top [j], and proj_reg_left[j] for any value of j in the range of 0 to i−1, inclusive.

Clause 7.2.6 of the OMAF draft specification specifies a global coverage information box. When the region-wise packing box is not present, the content covers the entire sphere. Therefore, this disclosure recognizes that, in this case, it is unnecessary for the global coverage information box to be present. However, currently, the global coverage information box may be present when a region-wise packing box is not present.

Accordingly, in addition or in the alternative to the techniques discussed above, content preparation device 20, server device 60, and/or client device 40 may be configured according to a constraint specifying that, when the region-wise packing box is not present, the global coverage information box shall not be present. Alternatively, the constraint may require that the global coverage information box indicates that the coverage is the entire sphere when the region-wise packing box is not present.

Clause 8.2.1 of the OMAF draft specification specifies a projection format (PF) descriptor. Clause 8.2.2 of the OMAF draft specification specifies a region-wise packing (RWPK) descriptor. The OMAF draft specification specifies that region-wise packing only applies to projected omnidirectional video. Therefore, this disclosure recognizes that, when the PF descriptor is not present, it is unnecessary to have the RWPK descriptor present. However, currently, when the PF descriptor is not present, the RWPK descriptor may still be present.

Accordingly, in addition or in the alternative to the techniques discussed above, content preparation device 20, server device 60, and/or client device 40 may be configured according to any or all of the following constraints regarding the presence of the RWPK descriptor:

1) When a PF descriptor is not present directly in the MPD, there shall not be a RWPK descriptor directly present in the MPD.
2) When a PF descriptor is not present directly in the MPD and not present directly in an AdaptationSet element, there shall not be a RWPK descriptor directly present in the AdaptationSet element.
3) When a PF descriptor is not present directly in a Representation element, is not present directly in the AdaptationSet element containing the Representation element, and not present directly in the MPD, there shall not be a RWPK descriptor directly present in the Representation element.

Clause 8.2.1 of the OMAF draft specification specifies the projection format (PF) descriptor. Clause 8.2.3 of the OMAF draft specification specifies the content coverage (CC) descriptor. There is coverage signalling on the file format level only for projected omnidirectional video. Therefore, this disclosure recognizes that, when the PF descriptor is not present, it is unnecessary to have the CC descriptor present. However, currently, when the PF descriptor is not present, the CC descriptor may still be present.

Accordingly, in addition or in the alternative to the techniques discussed above, content preparation device 20, server device 60, and/or client device 40 may be configured according to the following constraint regarding the presence of the CC descriptor:

When a PF descriptor is not present directly in the MPD or an AdaptationSet element, there shall not be a RWPK descriptor present in the AdaptationSet element.

That is, content preparation device 20, server device 60, and/or client device 40 may be configured to prevent processing of the RWPK descriptor of an AdaptationSet element of an MPD when a PF descriptor is not present directly in the MPD or the AdaptationSet element for one or more tracks of a media file. To prevent processing of the RWPK descriptor, content preparation device 20, server device 60, and/or client device 40 may be configured to skip processing of the RWPK descriptor, and treat data following a data conventionally preceding the RWPK descriptor as data that conventionally follows the RWPK descriptor.

Figure 2:
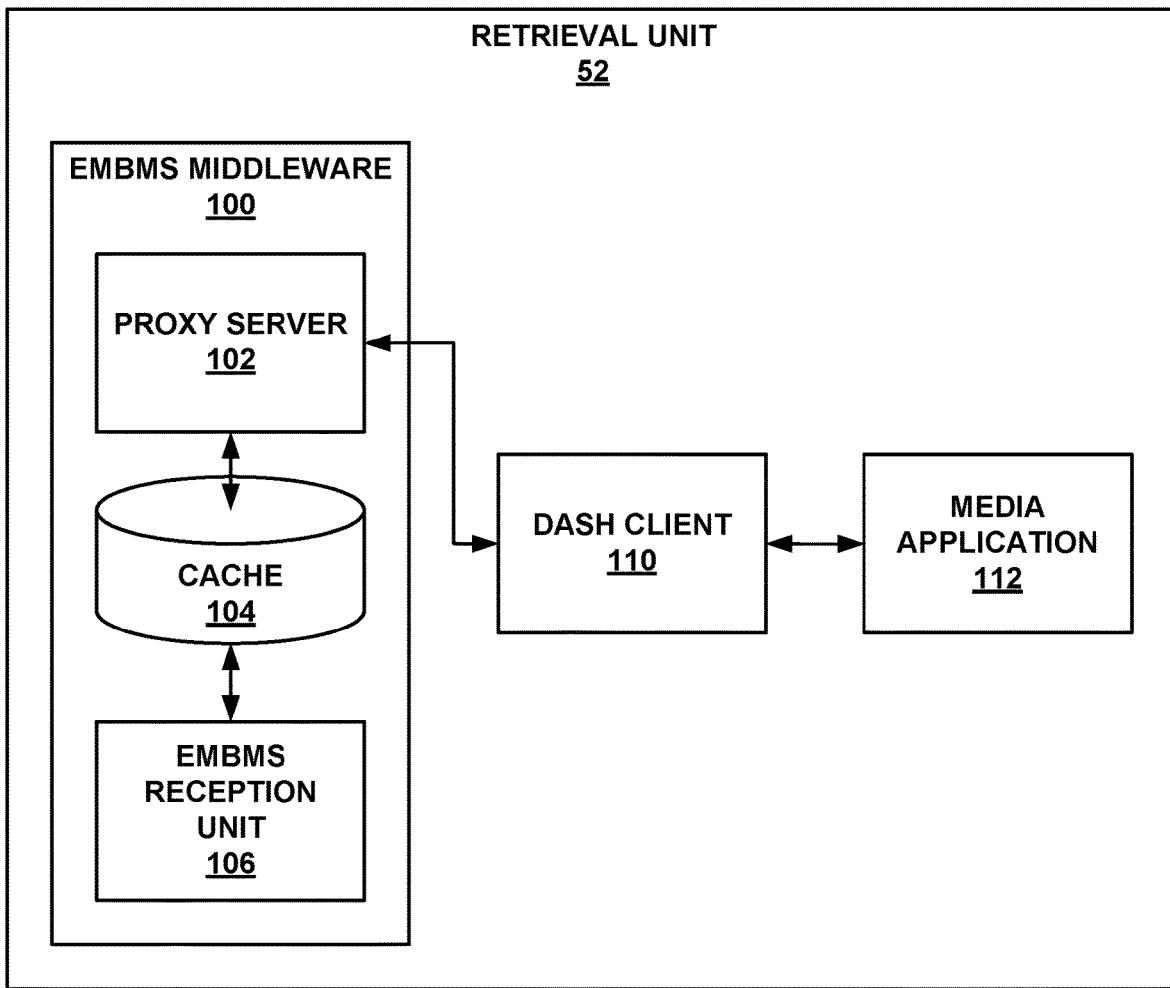
FIG. 2 is a block diagram illustrating an example set of components of a retrieval unit.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a BM-SC.

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Local server unit 102 may act as a server for DASH client 110. For example, local server unit 102 may provide a MPD file or other manifest file to DASH client 110. Local server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from local server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to local server unit 102. Local server unit 102 may retrieve requested data from cache 104 and provide the data to DASH client 110 in response to such requests.

Figure 3:
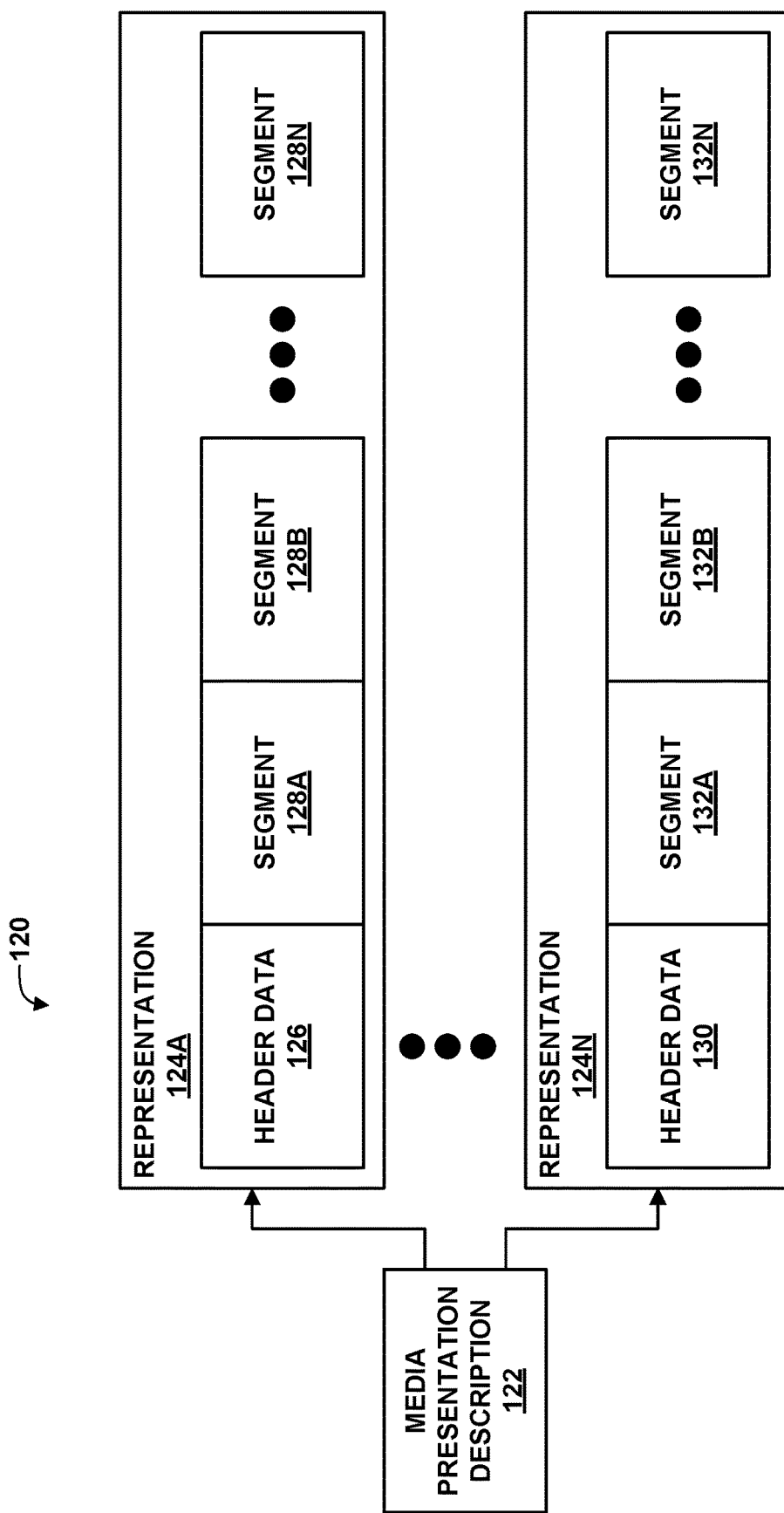
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 2. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

MPD 122 may include data constructed according to any or all of the techniques of this disclosure, alone or in any combination. For example, MPD 122 may include an adaptation set element that describes adaptation sets, which may include one or more of representations 124 that are switchable with each other for bandwidth adaptation. Moreover, MPD 122 may include a projection format (PF) descriptor. In some examples, when a PF descriptor is not present directly in MPD 122 or an adaptation set element thereof, MPD 122 may lack a region-wise packing (RWPK) descriptor in the adaptation set element. That is, content preparation device 20 may avoid adding the RWPK descriptor and file processing unit 50 may avoid attempting to process the RWPK descriptor when MPD 122 does not include the PF descriptor directly or in the adaptation set element.

Figure 4:
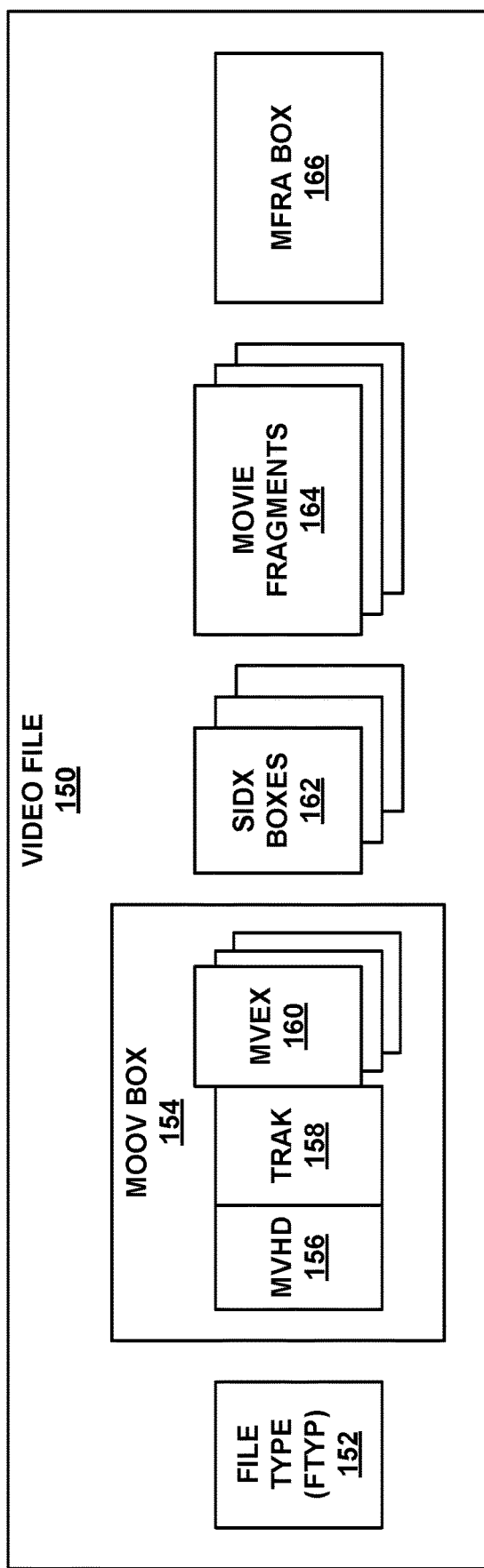
FIG. 4 is a block diagram illustrating elements of an example video file, which may correspond to a segment of a representation.

FIG. 4 is a block diagram illustrating elements of an example video file 150, which may correspond to a segment of a representation, such as one of segments 114, 124 of FIG. 3. Video file 150 also represents an example of a media file. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150. FIG. 7, discussed in greater detail below, provides additional information with respect to the MPD update box.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Video file 150 may include data constructed according to any or all of the techniques of this disclosure, alone or in any combination. For example, video file 150 may include at least two tracks that are associated with each other. In some examples, samples of the associated tracks may be considered to have a common composition time when a sample of one track has a first composition time, and a sample of the other track that is associated with the first track that has either the same first composition time or, if such a sample is not available, that has a closest composition time preceding the first composition time.

In general, two tracks may be considered to be associated when there is a dependency between the two tracks. For example, video data of one of the tracks may be predicted from video data of another one of the tracks. As one example, one of the tracks may include base layer video data for SVC, and another of the tracks may include enhancement layer video data for SVC. As another example, one of the tracks may include a base view for video data for MVC, and another of the tracks may include another view for video data for MVC. As yet another example, a base tile track may have an associated tile track. In some examples, the tracks may include video data for respective views of a stereo view pair. In still other examples, metadata tracks, audio tracks, and/or timed text tracks may be associated with corresponding video tracks.

Additionally or alternatively, a track of video file 150 for which a sample entry contains a composition restriction box may belong to a sub-picture composition track group or be a tile track. In the case that the track is a tile track, the presence of the composition restriction box may indicate that the tile track, and an associated tile base track, are not suitable for presentation, although media data of the tile track and the tile base track may still be decodable.

Additionally or alternatively, video file 150 may include a projected omnidirectional video box (ProjectedOmniVideoBox) that extends a FullBox data structure of ISO BMFF. In some examples, the projected omnidirectional video box may be contained within MOOV box 154. By extending the FullBox data structure, instead of the Box data structure of ISO BMFF, the projected omnidirectional video box may allow different versions of the projected omnidirectional video box to be used in various instances of video files such as video file 150.

Additionally or alternatively, video file 150 may only contain a global coverage information box when video file 150 contains a region-wise packing box. Thus, when the region-wise packing box is not included in video file 150, it may be presumed that video file 150 does not contain the global coverage information box. Accordingly, when the region-wise packing box is not detected, a file parser may interpret data at the position at which the global coverage information box would occur as a different box.

Figure 5:
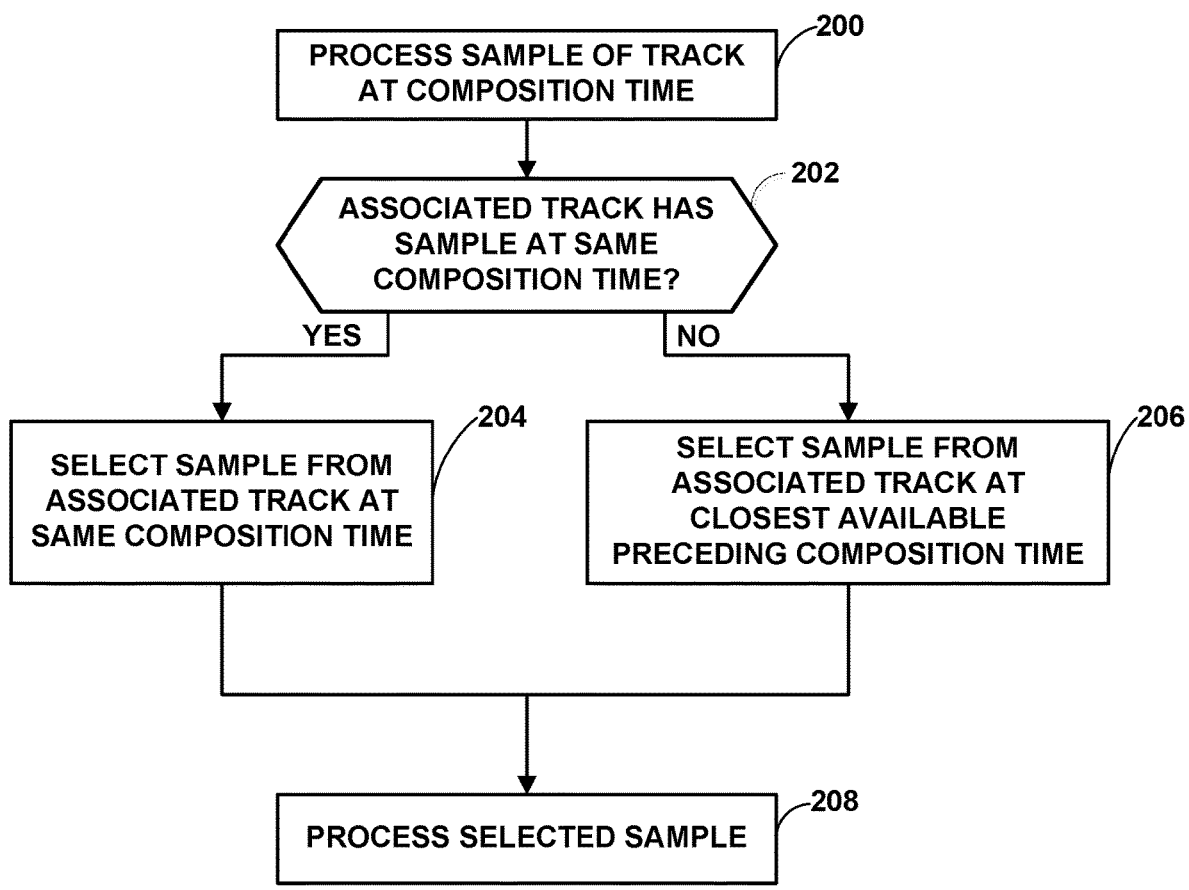
FIG. 5 is a flowchart illustrating an example method of processing media data in accordance with techniques of this disclosure.

FIG. 5 is a flowchart illustrating an example method of processing media data in accordance with techniques of this disclosure. The method of FIG. 5 is generally explained with respect to file processing unit 50 of client device 40 of FIG. 1. However, it should be understood that other devices may be configured to perform a similar method. For example, as noted below, encapsulation unit 30 of content preparation device 20 may be configured to perform this or a similar method.

Initially, file processing unit 50 may process a sample of a track of a media file at a particular composition time (200). The sample may be, for example, a movie fragment, such as one of movie fragments 164 (FIG. 4). The movie fragment may be one or more pictures. To process the sample, file processing unit 50 may extract the sample from the media file and pass the extracted sample to video decoder 48 (FIG. 1) to decode video data of the sample. Alternatively, when the method is performed by content preparation device 20, encapsulation unit 30 may receive one or more encoded pictures of video data and form a sample including the received one or more encoded pictures. Encapsulation unit 30 may further encapsulate the sample in the track of the media file.

File processing unit 50 may then determine whether an associated track of the media file has a sample at the same composition time (202). As noted above, the composition time may also be referred to as a presentation time. The original track may be a base tile track, and the associated track may be a tile track associated with the base tile track.

When the associated track does have a sample at the same composition time ("YES" branch of 202), file processing unit 50 may select the sample from the associated track at the same composition time (204). Alternatively, when the associated track does not have a sample at the same composition time ("NO" branch of 202), file processing unit 50 may select a sample from the associated track at a closest available preceding composition time (206). In either case, file processing unit 50 may proceed to process the selected sample (208). The selected sample may represent a time-parallel sample with respect to the sample of the original track, as defined above according to the techniques of this disclosure. Again, processing may include extracting the sample (when performed by file processing unit 50) or encapsulating the sample within the media file (when performed by encapsulation unit 30).

In this manner, the method of FIG. 5 represents an example of a method including processing a first sample of a first track of a media file, the first track having a first composition time, determining whether a second track of the media file, the second track being associated with the first track, has an available sample at the first composition time, when the second track has the available sample at the first composition time, selecting the available sample of the second track as a second sample having a common composition time with the first composition time of the first sample, when the second track does not have the available sample at the first composition time, selecting a sample of the second track having a composition time that is a closest available preceding composition time as the second sample having the common composition time with the first composition time of the first sample, and in response to selecting the second sample, processing the second sample.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing media data, the method comprising:
   processing a first sample of a first track of a media file, the first track having a first composition time;
   determining whether a second track of the media file, the second track being associated with the first track, has an available sample at the first composition time;
   when the second track has the available sample at the first composition time, selecting the available sample of the second track as a second sample having a common composition time with the first composition time of the first sample;
   when the second track does not have the available sample at the first composition time, selecting a sample of the second track having a composition time that is a closest available preceding composition time as the second sample having the common composition time with the first composition time of the first sample; and
   in response to selecting the second sample, processing the second sample.

2. The method of claim 1, wherein the first sample and the second sample have different decoding times.

3. The method of claim 1, further comprising, when a projection format (PF) descriptor is not present directly in a media presentation description (MPD) or an AdapatationSet element for the first track and the second track, preventing processing of a region-wise packing (RWPK) descriptor of the AdaptationSet element.

4. The method of claim 1, further comprising determining that the first track either belongs to a sub-picture composition track group or is a tile track in response to determining that a sample entry corresponding to the first track contains a composition restriction box.

5. The method of claim 1, further comprising determining that the second track either belongs to a sub-picture composition track group or is a tile track in response to determining that a sample entry corresponding to the second track contains a composition restriction box.

6. The method of claim 1, further comprising, when at least one of the first track or the second track is a tile track based on having a corresponding sample entry having a composition restriction box, preventing presentation of media data of the at least one of the first track or the second track.

7. The method of claim 1, further comprising processing a projected omnidirectional video box of media data, the omnidirectional video box comprising an extension of a FullBox data structure.

8. The method of claim 1, further comprising preventing projected regions of media data of at least one of the first track or the second track indicated by region-wise packing boxes from overlapping, wherein the projected regions comprise a first projected region comprising a rectangle specified by proj_reg_width[i], proj_reg_height[i], proj_reg_top[i], and proj_reg_left[i] and a second projected region comprising a rectangle specified by proj_reg_width[j], proj_reg_height[j], proj_reg_top[j], and proj_reg_left[j] for any value of j in the range of 0 to i−1, inclusive.

9. The method of claim 1, further comprising preventing processing a global coverage information box of media data of at least one of the first track or the second track when a region-wise packing box is not present in the media data of the at least one of the first track or the second track.

10. The method of claim 1, further comprising determining that a global coverage information box of media data of at least one of the first track or the second tack indicates that coverage is an entire sphere when a region-wise packing box of the media data of the at least one of the first track or the second track is not present.

11. The method of claim 1, further comprising at least one of:
   when a projection format (PF) descriptor is not present directly in a media presentation description (MPD) for the first track and the second track, preventing processing of a region-wise packing (RWPK) descriptor of the MPD;
   when the PF descriptor is not present directly in the MPD and not present directly in an AdaptationSet element, preventing processing of a RWPK descriptor of the AdaptationSet element; or
   when the PF descriptor is not present directly in a representation element, is not present directly in the AdaptationSet element containing the representation element, and not present directly in the MPD, preventing processing of a RWPK descriptor of the representation element.

12. The method of claim 1,
   wherein processing the first sample comprises encapsulating the first sample, the first sample comprising first encoded video data, and
   wherein processing the second sample comprises encapsulating the second sample, the second sample comprising second encoded video data.

13. The method of claim 1,
   wherein processing the first sample comprises decapsulating the first sample, the first sample comprising first encoded video data, and sending the first encoded video data to a video decoder, and
   wherein processing the second sample comprises decapsulating the second sample, the second sample comprising second encoded video data, and sending the second encoded video data to the video decoder.

14. The method of claim 1, wherein the first track comprises a tile base track, and the second track comprises a tile track associated with the tile base track.

15. A device for processing media data, the device comprising:
   a memory configured to store media data; and a processor comprising circuitry configured to:
process a first sample of a first track of a media file, the first track having a first composition time, the first sample including first media data;
determine whether a second track of the media file, the second track being associated with the first track, has an available sample at the first composition time;
when the second track has the available sample at the first composition time, select the available sample of the second track as a second sample having a common composition time with the first composition time of the first sample;
when the second track does not have the available sample at the first composition time, select a sample of the second track having a composition time that is a closest available preceding composition time as the second sample having the common composition time with the first composition time of the first sample; and
in response to selecting the second sample, process the second sample, the second sample including second media data.

16. The device of claim 15, wherein the first sample and the second sample have different decoding times.

17. The device of claim 15, wherein the processor is further configured to, when a projection format (PF) descriptor is not present directly in a media presentation description (MPD) or an AdapatationSet element for the first track and the second track, prevent processing of a region-wise packing (RWPK) descriptor of the AdaptationSet element.

18. The device of claim 15, wherein the processor is further configured to determine that the first track either belongs to a sub-picture composition track group or is a tile track in response to determining that a sample entry corresponding to the first track contains a composition restriction box.

19. The device of claim 15, wherein the processor is further configured to determine that the second track either belongs to a sub-picture composition track group or is a tile track in response to determining that a sample entry corresponding to the second track contains a composition restriction box.

20. The device of claim 15, wherein the processor is further configured to, when at least one of the first track or the second track is a tile track based on having a corresponding sample entry having a composition restriction box, prevent presentation of media data of the at least one of the first track or the second track.

21. The device of claim 15, wherein the processor is further configured to process a projected omnidirectional video box of media data, the omnidirectional video box comprising an extension of a FullBox data structure.

22. The device of claim 15, wherein the processor is further configured to prevent projected regions of media data of at least one of the first track or the second track indicated by region-wise packing boxes from overlapping, wherein the projected regions comprise a first projected region comprising a rectangle specified by proj_reg_width[i], proj_reg_height[i], proj_reg_top[i], and proj_reg_left[i] and a second projected region comprising a rectangle specified by proj_reg_width[j], proj_reg_height[j], proj_reg_top[j], and proj_reg_left[j] for any value of j in the range of 0 to i−1, inclusive.

23. The device of claim 15, wherein the processor is further configured to prevent processing a global coverage information box of media data of at least one of the first track or the second track when a region-wise packing box is not present in the media data of the at least one of the first track or the second track.

24. The device of claim 15, wherein the processor is further configured to determine that a global coverage information box of media data of at least one of the first track or the second tack indicates that coverage is an entire sphere when a region-wise packing box of the media data of the at least one of the first track or the second track is not present.

25. The device of claim 15, wherein the processor is further configured to at least one of:
when a projection format (PF) descriptor is not present directly in a media presentation description (MPD) for the first track and the second track, prevent processing of a region-wise packing (RWPK) descriptor of the MPD;
when the PF descriptor is not present directly in the MPD and not present directly in an AdaptationSet element, prevent processing of a RWPK descriptor of the AdaptationSet element; or
when the PF descriptor is not present directly in a representation element, is not present directly in the AdaptationSet element containing the representation element, and not present directly in the MPD, prevent processing of a RWPK descriptor of the representation element.

26. The device of claim 15, further comprising a video encoder configured to encode first video data to form first encoded video data and to encode second video data to form second encoded video data, the first media data comprising the first encoded video data, and the second media data comprising the second encoded video data,
wherein to process the first sample, the processor is configured to encapsulate the first sample, the first sample comprising the first encoded video data, and
wherein to process the second sample, the processor is configured to encapsulate the second sample, the second sample comprising the second encoded video data.

27. The device of claim 15, further comprising a video decoder configured to decode video data,
wherein to process the first sample, the processor is configured to decapsulate the first sample, the first sample comprising first encoded video data, the first media data comprising the first encoded video data, and send the first encoded video data to the video decoder, and
wherein to process the second sample, the processor is configured to decapsulate the second sample, the second sample comprising second encoded video data, the second media data comprising the second encoded video data, and send the second encoded video data to the video decoder.

28. The device of claim 15, wherein the device comprises at least one of:
an integrated circuit;
a microprocessor; or
a wireless communication device.

29. A device for processing media data, the device comprising:
means for processing a first sample of a first track of a media file, the first track having a first composition time;
means for determining whether a second track of the media file, the second track being associated with the first track, has an available sample at the first composition time;

means for selecting, when the second track has the available sample at the first composition time, the available sample of the second track as a second sample having a common composition time with the first composition time of the first sample;

means for selecting, when the second track does not have the available sample at the first composition time, a sample of the second track having a composition time that is a closest available preceding composition time as the second sample having the common composition time with the first composition time of the first sample; and means for processing, in response to selecting the second sample, the second sample.

30. The device of claim 29, wherein the first sample and the second sample have different decoding times.

31. The device of claim 29, further comprising means for preventing, when a projection format (PF) descriptor is not present directly in a media presentation description (MPD) or an AdapatationSet element for the first track and the second track, processing of a region-wise packing (RWPK) descriptor of the AdaptationSet element.

32. The device of claim 29, further comprising a video encoder configured to encode first video data to form first encoded video data and to encode second video data to form second encoded video data,
wherein the means for processing the first sample comprises means for encapsulating the first sample, the first sample comprising the first encoded video data, and
wherein the means for processing the second sample comprises means for encapsulating the second sample, the second sample comprising the second encoded video data.

33. The device of claim 29, further comprising a video decoder,
wherein the means for processing the first sample comprises means for decapsulating the first sample, the first sample comprising first encoded video data, and means for sending the first encoded video data to the video decoder, and
wherein the means for processing the second sample comprises means for decapsulating the second sample, the second sample comprising second encoded video data, and means for sending the second encoded video data to the video decoder.

34. A non-transitory computer-readable storage medium having stored thereon instructions that, when executed, cause a processor to:
process a first sample of a first track of a media file, the first track having a first composition time;
determine whether a second track of the media file, the second track being associated with the first track, has an available sample at the first composition time;
when the second track has the available sample at the first composition time, select the available sample of the second track as a second sample having a common composition time with the first composition time of the first sample;
when the second track does not have the available sample at the first composition time, select a sample of the second track having a composition time that is a closest available preceding composition time as the second sample having the common composition time with the first composition time of the first sample; and
in response to selecting the second sample, process the second sample.

35. The non-transitory computer-readable storage medium of claim 34, wherein the first sample and the second sample have different decoding times.

36. The non-transitory computer-readable storage medium of claim 34, further comprising instructions that cause the processor to, when a projection format (PF) descriptor is not present directly in a media presentation description (MPD) or an AdapatationSet element for the first track and the second track, prevent processing of a region-wise packing (RWPK) descriptor of the AdaptationSet element.

37. The non-transitory computer-readable storage medium of claim 34,
wherein the instructions that cause the processor to process the first sample comprise instructions that cause the processor to encapsulate the first sample, the first sample comprising first encoded video data, and
wherein the instructions that cause the processor to process the second sample comprise instructions that cause the processor to encapsulate the second sample, the second sample comprising second encoded video data.

38. The non-transitory computer-readable storage medium of claim 34,
wherein the instructions that cause the processor to process the first sample comprise instructions that cause the processor to decapsulate the first sample, the first sample comprising first encoded video data, and send the first encoded video data to a video decoder, and
wherein the instructions that cause the processor to process the second sample comprise instructions that cause the processor to decapsulate the second sample, the second sample comprising second encoded video data, and send the second encoded video data to the video decoder.

* * * * *